US012367750B2

(12) United States Patent
Müller et al.

(10) Patent No.: US 12,367,750 B2
(45) Date of Patent: Jul. 22, 2025

(54) SAFETY SYSTEM AND METHOD USING A SAFETY SYSTEM

(71) Applicant: SICK AG, Waldkirch (DE)

(72) Inventors: Angelina Müller, Waldkirch (DE); Carsten Natzkowski, Waldkirch (DE); Hans-Jürgen Kammer, Waldkirch (DE); Sebastian Kupferschmid, Waldkirch (DE)

(73) Assignee: SICK AG, Waldkirch (DE)

( * ) Notice: Subject to any disclaimer, the term of this patent is extended or adjusted under 35 U.S.C. 154(b) by 69 days.

(21) Appl. No.: 18/232,956

(22) Filed: Aug. 11, 2023

(65) Prior Publication Data

US 2024/0054876 A1 Feb. 15, 2024

(30) Foreign Application Priority Data

Aug. 12, 2022 (DE) ......................... 102022120424.3

(51) Int. Cl.
*G08B 21/02* (2006.01)
*G08C 17/02* (2006.01)

(52) U.S. Cl.
CPC ......... *G08B 21/02* (2013.01); *G08B 21/0272* (2013.01); *G08C 17/02* (2013.01)

(58) Field of Classification Search
CPC .... G08B 21/02; G08B 21/0272; G08C 17/02; G01S 13/878; G01S 13/74; G01S 13/76; G01S 5/02; G01S 19/42; H04W 4/33
See application file for complete search history.

(56) References Cited

U.S. PATENT DOCUMENTS 5,774,876 A * 6/1998 Woolley .................. G01S 13/74
700/214
8,965,677 B2 * 2/2015 Breed .................... G08G 1/163
701/301

(Continued)

FOREIGN PATENT DOCUMENTS

DE 202021100273 U1 4/2022

*Primary Examiner* — Adnan Aziz
(74) *Attorney, Agent, or Firm* — Nath, Goldberg & Meyer; Jerald L. Meyer

(57) ABSTRACT

A safety system (1) and a method using a safety system (1) for localizing at least one spatially variable object (2) having at least one first real time control and evaluation unit (3), having at least one radio location system (4), wherein the radio location system (4 has at least three arranged radio stations (5); wherein at least one radio transponder (6) is arranged at the object (2); wherein the radio transponder (6) has a check unit (8); wherein the radio transponder (6) has safe switch outputs (9); wherein position data of the radio transponder and thus position data of the object (2) are determined by means of the radio location system (4); wherein the position data are transmitted to the first real time control and evaluation unit (3) by the radio stations (5) of the radio location system (4); wherein the first real time control and evaluation unit (3) is configured to cyclically detect the position data of the radio transponder (6); wherein a second real time control and evaluation unit (7) is provided; wherein the second real time control and evaluation unit (7) is connected to the first real time control and evaluation unit (3); wherein the first real time control and evaluation unit (3) is checked by the second real time control and evaluation unit (7); wherein the second real time control and evaluation unit (7) is configured with two channels; and wherein there is a radio communication connection between the radio transponder and the second real time control and evaluation unit (7) via the first real time control and evaluation unit (3).

5 Claims, 2 Drawing Sheets

(56) References Cited

U.S. PATENT DOCUMENTS

Figure 1:
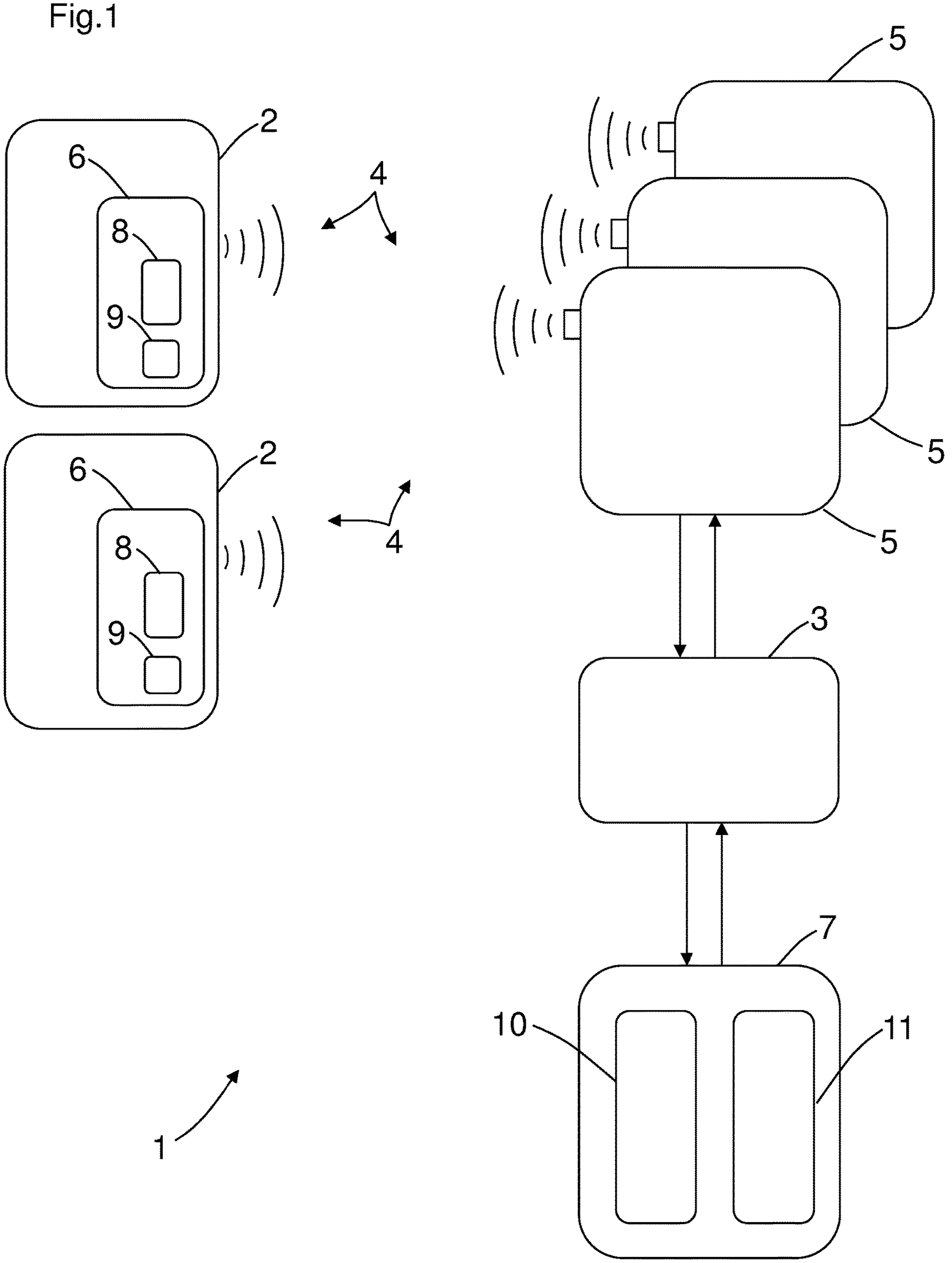

| | | | | |
|---|---|---|---|---|
| 2006/0190538 | A1* | 8/2006 | Hwang | H04L 67/51<br>709/204 |
| 2009/0270065 | A1* | 10/2009 | Hamada | G08B 7/066<br>455/404.1 |
| 2011/0315765 | A1* | 12/2011 | Schantz | G01S 13/751<br>235/385 |
| 2015/0049911 | A1* | 2/2015 | Doettling | G08B 21/22<br>382/103 |
| 2019/0141473 | A1* | 5/2019 | Swart | G01S 5/0036 |
| 2019/0155278 | A1* | 5/2019 | Idbrant | G01S 13/765 |
| 2019/0212433 | A1* | 7/2019 | Horst | G06K 19/0702 |
| 2022/0050936 | A1* | 2/2022 | Kincart | G06Q 30/0282 |
| 2022/0210620 | A1* | 6/2022 | Wahl | G01S 1/0428 |
| 2022/0279472 | A1* | 9/2022 | Amsalem | G06K 19/0724 |
| 2023/0062514 | A1* | 3/2023 | Hladik | G01S 5/0244 |

* cited by examiner

SAFETY SYSTEM AND METHOD USING A SAFETY SYSTEM

The present invention relates to a safety system in accordance with the preamble of claim 1 and to a method using a safety system in accordance with the preamble of claim 5.

The monitoring of a large number of persons and hazard sources, for example from vehicles, machines, or robots on a shop floor, requires a lot of processing power for tracking the persons and for hazard determination. Conventional systems of safety engineering in accordance with the present state of the art do not have the required processing power or are very expensive.

Decentralized solutions, e.g. laser scanners on vehicles, zone safeguarding using light grids, around hazard points, etc., are used to today instead of centrally monitoring the safety of persons on a shop floor.

Safety relevant automation work is taken over by the following processing units in accordance with the prior art:

safe controllers (e.g. Flexisoft of the company SICK AG)

unsafe controllers, e.g. industrial PCs using software coded processing in conjunction with safe hardware redundant unsafe controllers (separate hardware).

Safe controllers have the following disadvantages with respect to unsafe processing units:

higher costs less available processing power.

Unsafe systems using software coded processing have the following disadvantages:

Software coded processing reduces the available processing power.

Safe hardware is required to generate the safe shut-down signal despite the software coded processing.

Unsafe systems using redundant hardware have the following disadvantages:

high costs a safe comparator or "majority voter" is required.

DE 202021100273 U1 discloses a safety system for localizing at least one spatially variable object having at least one control and evaluation unit, having at least one radio location system, wherein the radio location system has at least three arranged radio stations, wherein at least one radio transponder is arranged at the object; wherein position data of the radio transponder and thus position data of the object can be determined by means of the radio location system; wherein the position data can be transmitted to the control and evaluation unit by the radio station of the radio location system; wherein the control and evaluation unit is configured to cyclically detect the position data of the radio transponder; wherein a first check unit is provided; wherein the first check unit is connected to the control and evaluation unit; and wherein the control and evaluation unit is checked by the first check unit.

It is an object of the invention to provide an improved safety system.

The object is satisfied in accordance with claim 1 by a safety system for localizing at least one spatially variable object having at least one first real time control and evaluation unit, having at least one radio location system, wherein the radio location system has at least three arranged radio stations; wherein at least one radio transponder is arranged at the object; wherein the radio transponder has a check unit; wherein the radio transponder has safe switch outputs; wherein position data of the radio transponder and thus position data of the object can be determined by means of the radio location system; wherein the position data can be transmitted to the first real time control and evaluation unit by the radio stations of the radio location system; wherein the first real time control and evaluation unit is configured to cyclically detect the position data of the radio transponder; wherein a second real time control and evaluation unit is provided; wherein the second real time control and evaluation unit is connected to the first real time control and evaluation unit; wherein the first real time control and evaluation unit can be checked by the second real time control and evaluation unit; wherein the second real time control and evaluation unit is configured with two channels; and wherein there is a radio communication connection between the radio transponder and the second real time control and evaluation unit via the first real time control and evaluation unit.

The object is further satisfied in accordance with claim 5 by a method using a safety system for localizing at least one spatially variable object having at least one first real time control and evaluation unit, having at least one radio location system, wherein the radio location system has at least three arranged radio stations; wherein at least one radio transponder is arranged at the object; wherein the radio transponder has a check unit; wherein the radio transponder has safe switch outputs; wherein position data of the radio transponder and thus position data of the object are determined by means of the radio location system; wherein the position data can be transmitted to the first real time control and evaluation unit by the radio stations of the radio location system; wherein the first real time control and evaluation unit is configured to cyclically detect the position data of the radio transponder; wherein a second real time control and evaluation unit is provided; wherein the second real time control and evaluation unit is connected to the first real time control and evaluation unit; wherein the first real time control and evaluation unit is checked by the second real time control and evaluation unit; and wherein the second real time control and evaluation unit is configured with two channels; wherein there is a radio communication connection between the radio transponder and the second real time control and evaluation unit via the first real time control and evaluation unit.

An architecture or a safety system is described by the invention that enables the safety related performance of complex algorithms on a central processing unit, namely the second real time control and evaluation unit. The second real time control and evaluation unit is configured with two channels for this purpose.

In addition, there is a safe shutdown path via a communication channel. The safe shutdown path is provided by the radio transponder. For this purpose, the radio transponder has the check unit and the safe switch outputs.

There is a radio communication connection between the radio transponder and the second real time control and evaluation unit via the first real time control and evaluation unit. The shutdown path is provided via a radio transmission via the radio communication connection, that is a wireless transmission of data from the second real time control and evaluation unit to the first real time control and evaluation unit and then to the radio transponder. If, for example, there is an error in a position determination in the second real time control and evaluation unit, the radio transponder is caused via the radio communication connection to output a safety signal via the safety outputs.

A central monitoring of the safety thus takes place, for example, on a shop floor in conjunction with radio transponders at persons or, for example, at machines.

The first real time control and evaluation unit is formed, for example, by an RTLS unit (real time location system server) or an RTLS server.

The first real time control and evaluation unit or an RTLS unit receives the measured signal times of flight and determines position values of the radio transponders present therefrom.

The localization of the radio transponders takes place, for example, by time of flight measurements of radio signals that are cyclically exchanged between the radio transponders and a plurality of fixed position radio stations. This trilateration works very well when the signals are transmitted at a sufficient signal strength and on a straight or direct propagation path.

The localization of the radio transponders takes place, for example, by directional measurements of radio signals that are cyclically exchanged between the radio transponders and a plurality of fixed position radio stations. This triangulation works very well when the signals are transmitted at a sufficient signal strength and on a straight or direct propagation path.

The signals of a radio transponder are received by a plurality of fixed position radio stations or anchor stations and the basis for the localization is created via a time of flight measurement, e.g. the time of arrival (TOA) or e.g. the time difference of arrival (TDOA). The calculation or estimation of the position of a radio transponder then takes place on the first real time control and evaluation unit, for example an RTLS (real time location system server) that is connected to all the radio stations or anchor stations via a wireless or wired data link. This mode of localization is called an RTLS (real time location system) mode.

In accordance with the invention, an implementation of a functionally safe shutdown path takes place by a wireless transmission of data.

A superior system, that is the second real time control and evaluation unit, for example monitors a plurality of objects, for example machines, autonomous vehicles, and persons on a field plane, that is, for example, on a factory floor, by means of wireless radio technology, for example in a logistical environment, on non-safe hardware, e.g. an industrial computer on a "server level" in real-time time. On e.g. an impending collision between an autonomous vehicle with a person or for other reasons, a functionally safe shutdown path to, for example, a machine can be triggered on the field level with the aid of the superior monitoring by the second real time control and evaluation unit on the server level. A functionally safe field level, that is the possibility of switching of or at least reducing a hazardous movement, is obligatory here so that a hazardous movement is no longer present.

The safety system consists of at least the radio transponder in the field level, the first real time control and evaluation unit that provides the wireless radio data transmission, and a server level, that is the second real time control and evaluation unit.

The information of the field level, that is of the radio transponders, is verified on the server level, that is on the second real time control and evaluation unit, since the data that are transmitted via the first real time control and evaluation unit are initially to be considered unsafe. The verification and calculation on the second real time control and evaluation unit takes place on two separate instances, that is over two channels.

For this purpose, the second real time control and evaluation unit can, for example, have two industrial personal computers or industrial computers.

Payload, that is position data of the object, is, for example, provided in a message by a first channel of the second real time control and evaluation unit and check data (checksum/checksums) of the payload, that is check data of the position data of the object of a message are provided through the second channel.

A respective portion of the information, that is the payload or check data, is output per instance or per channel, is packed into a message, that is a telegram, and is transmitted back to the radio transponder on the field level via the first real time control and evaluation unit. The telegram is unpacked in the radio transponder on the field level and the individually calculated parts are compared with one another and thus a correct calculation is checked on the radio transponder and evaluated or verified on the server level.

Unlike the decentralized approach, fewer safety sensors are required at the hazardous cells due to the central monitoring of the safety; e.g. every autonomous vehicle on a shop floor no longer has to be equipped with optoelectronic safety sensors, for example laser scanners. A cost saving potential is thereby produced for the operator. In addition, application specific restrictions can be resolved, e.g. the restrictive property of laser scanners that can only check the field of view of the protected field and cannot check shaded zones.

The approach in accordance with the invention helps to provide safe central monitoring and the processing power required for it. However, only electronic components (hardware) not safe per se are used here. No previous certified redundant safety controllers are required either, for example. In accordance with the invention, both transmission errors and physical defects in the electronics are monitored.

Superior safety functions (cf. advanced safety features) that are namely verified at a field level by means of the radio transponders and are thus safe in the sense of functional safety are therefore calculated on an unsafe industrial computer, for example.

Defective datasets, for example defective messages or telegrams whose individually calculated parts, that is payload and check data, do not agree are interpreted as a shutdown command by the radio transponder, i.e. the system is switched into the safe state by the radio transponder.

Either additional safety can be ensured, for example, by a multiple query by at least two valid and evaluated messages (e.g. if at least one message includes a shutdown command or if at least one message is defective, in brief a two out of two evaluation, 2oo2 evaluation) and/or greater availability can be provided (e.g. if a message includes a shutdown command or if at least one message is defective, in brief a one out of two evaluation, 1oo2 evaluation).

The messages having the included safety functions or safety information can, for example, be redundantly transmitted to the radio transponders via different radio stations to increase the availability.

In a further development of the invention, the second real time control and evaluation unit is a server, with the server software being configured in two channels.

The second real time control and evaluation unit can, for example, have two docker containers. A docker simplifies the provision of applications because containers containing all the required information can easily be transported and installed as files. Containers ensure the separation and administration of the resources used on a processor. This, for example, includes codes, time of flight modules, system tools, system libraries, that is everything that can be installed on a processor.

In a further development of the invention, the radio transponders have an identification, with a respective radio transponder being associated with a respective object, whereby the first real time control and evaluation unit and/or the second real time control and evaluation unit is configured to distinguish the objects The objects are, for example, mobile objects, wherein the radio transponders have an identification, with a respective radio transponder being associated with a mobile object, whereby the first and/or second real time control and evaluation units are configured to distinguish the mobile objects.

The mobile object or mobile machine can, for example, be a guideless vehicle, a driverless vehicle or an autonomous vehicle, an automated guided vehicle (AGV), an automatic mobile robot (AMR), an industrial mobile robot (IMR), or a robot having movable robot arms. The mobile machine thus has a drive and can be moved in different directions.

Furthermore, for example, first objects are persons and second objects are mobile objects, with the radio transponders having an identification, with a respective radio transponder being associated with at least one person and a respective radio transponder being associated with at least one mobile object, whereby the first real time control and evaluation unit is configured to distinguish the persons and mobile objects.

In a further development of the invention, the radio location system is an ultra wideband radio location system, with the frequency used being in the range from 3.1 GHz to 10.6 GHz, with the transmission energy per radio station amounting to a maximum of 0.5 mW.

An absolute bandwidth in an ultra wideband radio location system amounts to at least 500 MHz or a relative bandwidth amounts to at least 20% of the central frequency.

The range of such a radio location system amounts, for example, to 0 to 50 m. In this respect, the short time duration of the radio pulses is used for the localization.

The radio location system thus only transmits radio waves having a low energy. The system can be used very flexibly and has no interference.

The following principles are provided, for example, on how the radio transponder selects and with which radio stations the radio transponder communicates. The radio transponder communicates with at least three radio stations.

- The radio location system communicates broadcasts as standard. The radio transponders/radio stations only evaluate the responses (blinks) that are relevant to them, i.e. include associated identification addresses.
- For example, either one or more radio transponders/radio stations may transmit within a predetermined time period.

The following is provided to deal with defective data:

As soon as a message or a telegram from a radio station is defective, the defective message is interpreted as a shutdown command by the radio transponder. The advantage is high safety, but also less availability.

A multiple evaluation (for example, a two-fold, three-fold, or n-fold evaluation, fixed by a user) is provided, for example, depending on a sought response time of the safety system. A multiple query with at least two valid and evaluated messages can either ensure additional safety (e.g. two out of two evaluation, in brief: 2oo2 evaluation) and/or can provide greater availability (e.g. one out of two evaluation, in brief 1oo2 evaluation).

Defective messages are simply discarded. A timer or a time monitoring unit (watchdog) of the check unit of the radio transponder is not reset, for example. This is the borderline case that one of n responses has to be correct for the case that n corresponds to the number of responses until the reset of the time monitoring unit.

It is either sufficient if the messages/message from a radio station are/is in order or the messages of all the radio stations currently selected for the communication have to be in order. Or the telegrams from a certain proportion of radio stations have to be in order, e.g. the messages from at least 3 radio stations.

Instead of shutting down a machine, a local safety response can also be activated, for example. A local safety sensor, for example a safety laser scanner, an ultrasound sensor, or a stereo camera, is activated on the autonomous vehicle, for example.

A decision making unit that determines which messages are evaluated and which not is provided in the first and/or second real time control and evaluation units, for example. A selection takes place, for example, with reference to a signal strength of the messages.

The data from specific radio stations with reference to a planned route and the last determined position are, for example, automatically ignored (optionally after an averaging over a plurality of measurements), e.g. because it was recognized from the measurements of previous journeys, by the radio transponder, or by other radio transponders, or on the measurement as part of the putting into operation that the communication with certain radio stations on a certain part of the route of the autonomous vehicle is disrupted, e.g. due to shutdown errors, that is a lack of radio communication.

Stationary and semi-stationary machines: The transmission channel over the first real time control and evaluation unit between the central second real time control and evaluation unit and the radio transponders can also be wired (e.g. over an Ethernet interface) or also in a mixed manner wired and by radio communication.

A verification of the calculation on the server plane, that is on the second real time control and evaluation unit, does not necessarily have to be coupled to safety and can also be used in an unsafe manner as an error discovery to make the system more robust.

A radio transponder can report a status back to the second real time control and evaluation unit that the calculations on the second real time control and evaluation unit have been calculated correctly and have been verified by the radio transponder on a field level. As an additional confirmation that the safety system is working correctly.

The feedback can take place over the same or over different communication channels than the monitored communication channel. A monitored communication takes place, for example, via a radio information message to the safety system that communication has been disrupted.

The feedback that the radio transponder has recognized an error can also takes place at another instance. For example at another third real time control and evaluation unit that provides data for diagnosis by service engineers
maintenance to persons/workers
job for defect remedy to persons/workers
to warn stationary machines or to activate a local safety monitoring or even to shut down the machines.

This solves the problem that stationary machines may not have any radio communication of their own, but nevertheless have to be shut down for safety reasons if the associated second real time control and evaluation unit no longer works properly.

Feedback can also take place directly to adjacent radio transponders. As a warning or prompt to activate their own local safety monitoring.

I.e. the radio transponder can, for example, output a help message or a call for help when the radio transponder has initiated an emergency stop. The radio transponder can also transmit a warning message if the radio transponder is about to initiate an emergency stop.

The help messages or warning messages can be further processed differently:

1. Direct forwarding to the service personnel/worker
2. Forwarding to multiple evaluation
3. Forwarding only when a predetermined number/percentage of radio transponders have detected an error, e.g. 20%.
4. Forwarding only when a predetermined number of radio transponders have detected an error. E.g. two of three radio transponders that have not exceeded a certain distance from one another before they have no longer received any valid messages.
5. Radio transponders having special functions can also be provided. E.g. radio transponders that evaluate messages/telegrams that are actually intended for e.g. two or three different standard radio transponders. The safety system, for example, is aware of the position of these radio transponders having special functions, the signal quality with regard to a certain number of radio stations and possible interference sources e.g. by previous measurements. The safety system can give greater weight to or prioritize information on errors that originate from these radio transponders having special functions.

The safe shutdown path can also be used for other communication purposes such as, for example, as a warning function for persons or as an indicator for report radio transponders that can output an optical or acoustic signal. A classification of the different radio transponders into e.g. radio transponders for machines, for persons, or for reports is furthermore possible, for example.

A classification of the different radio transponders can furthermore be given different safety levels. A person can trigger the safety stop of a machine on an approach to the machine.

Radio transponders for machines can also mutually transmit messages to stop a hazardous movement over the first real time control and evaluation unit. Autonomous vehicles can thus be protected from collisions. Especially when they e.g. temporarily require an extremely large protected field since they transport a load that overhangs or is, for example, larger than in the standard protected field.

The safety system can also be used for a plurality of subsystems to combine and to verify different technologies. For example, different positions (participants having radio transponders) can be determined by the safeguarding on a field level by two different first real time control and evaluation units and can be put into relation on a server level, namely on the second real time control and evaluation unit, which is in turn verified on a field level by means of the radio transponders. Two subsystems can e.g. mean that there are two safety systems that are separated from one another spatially or by the use of different radio channels, that is different frequency bands. The position data of both safety systems can be combined in a superior expanded further real time control and evaluation unit.

The invention will also be explained in the following with respect to further advantages and features with reference to the enclosed drawing and embodiments.

Figure 2:
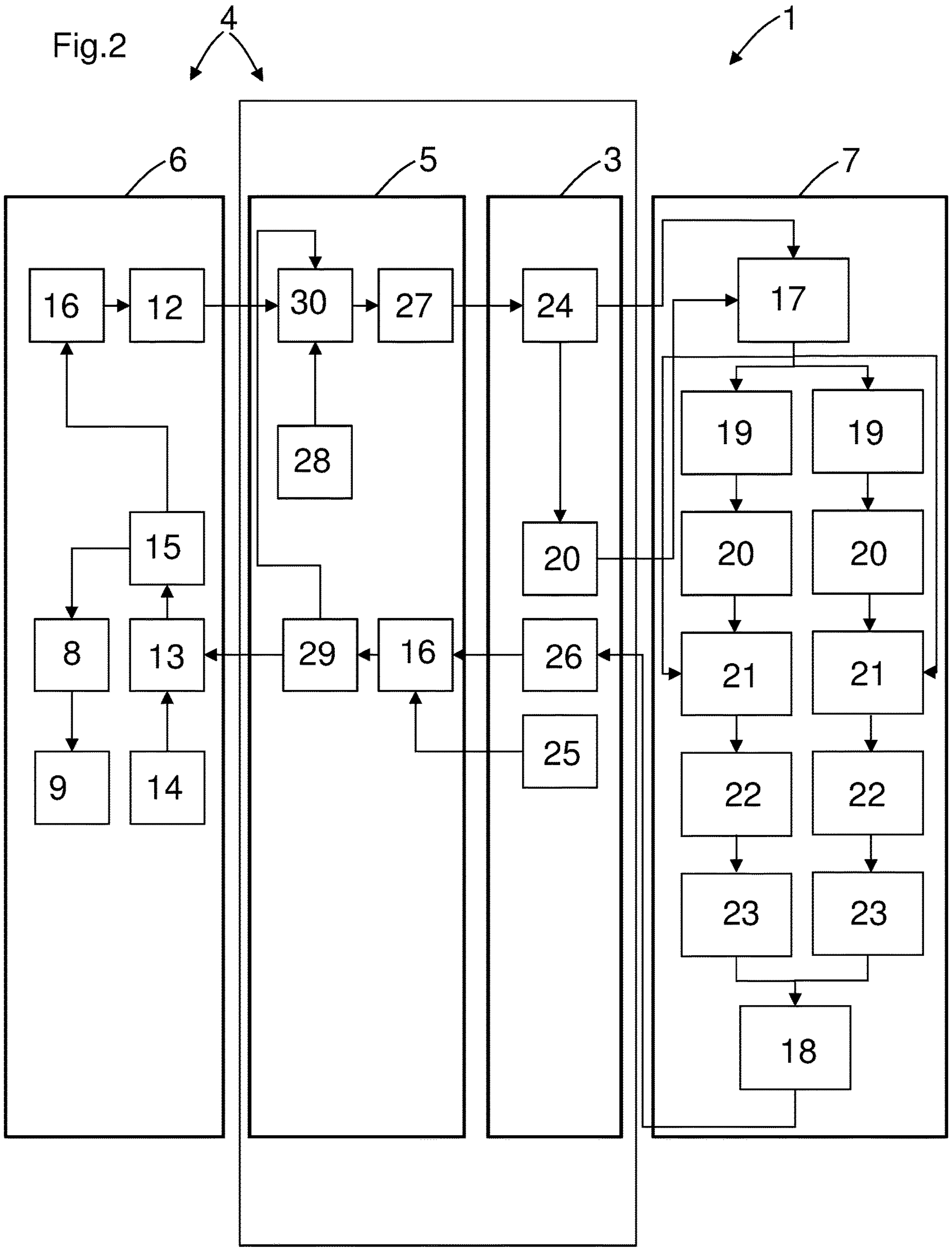

The Figures of the drawing show in:

FIG. 1 and FIG. 2 respectively a safety system.

In the following Figures, identical parts are provided with identical reference numerals.

FIG. 1 shows a safety system 1 for localizing at least one spatially variable object 2 having at least one first real time control and evaluation unit 3, having at least one radio location system 4, wherein the radio location system 4 has at least three arranged radio stations 4; wherein at least one radio transponder 6 is arranged at the object 2; wherein the radio transponder 6 has a check unit 8; wherein the radio transponder 6 has safe switch outputs 9; wherein position data of the radio transponder 6 and thus position data of the object 2 can be determined by means of the radio location system 4; wherein the position data can be transmitted to the first real time control and evaluation unit 3 by the radio stations 5 of the radio location system 4; wherein the first real time control and evaluation unit 3 is configured to cyclically detect the position data of the radio transponder 6; wherein a second real time control and evaluation unit 7 is provided; wherein the second real time control and evaluation unit 7 is connected to the first real time control and evaluation unit 3; wherein the first real time control and evaluation unit 3 can be checked by the second real time control and evaluation unit 7; wherein the second real time control and evaluation unit 7 is configured with two channels; and wherein there is a radio communication connection between the radio transponder 6 and the second real time control and evaluation unit via the first real time control and evaluation unit 3.

The shutdown path is provided via a radio transmission via the radio communication connection, that is a wireless transmission of data by the second real time control and evaluation unit 7 to the first real time control and evaluation unit 3 and then to the radio transponder 6. If, for example, there is an error in a position determination in the second real time control and evaluation unit 7, the radio transponder 6 is caused via the radio communication connection to output a safety signal via the safety outputs 9.

A central monitoring of the safety thus takes place, for example, on a shop floor in conjunction with radio transponders 6 at persons or, for example, at machines.

The first real time control and evaluation unit 3 or an RTLS unit receives the measured signal times of flight and determines position values of the existing radio transponders 6 therefrom.

The localization of the radio transponders 6 takes place by time of flight measurements of radio signals that are cyclically exchanged between the radio transponders 6 and a plurality of fixed position radio stations 5.

A superior system, that is the second real time control and evaluation unit 7, for example, monitors a plurality of objects 2, for example machines, autonomous vehicles, and persons on a field plane, that is, for example, on a factory floor, by means of wireless radio technology, for example in a logistical environment, on initially unsafe hardware, e.g. an industrial computer on a "server level" in real-time time.

The safety system 1 consists of at least the radio transponder 6 in the field level, the first real time control and evaluation unit 3 that provides the wireless radio data transmission, and a server level, that is the second real time control and evaluation unit 7.

The information of the field level, that is of the radio transponders 6, is verified on the server level, that is on the second real time control and evaluation unit 7, since the data that are transmitted via the first real time control and evaluation unit 3 are initially to be considered unsafe. The verification and calculation on the second real time control and evaluation unit 7 takes place on two separate instances, that is over two channels.

Payload, that is position data of the object 2, is, for example, provide in a message by a first channel 10 of the second real time control and evaluation unit 7 and check data (checksum/checksums) of the payload, that is check data of the position data of the object 2 of a message are provided by the second channel.

A respective portion of the information, that is the payload or check data, is output per instance or per channel, is packed into a message, that is a telegram, and is transmitted back to the radio transponder 6 on the field level via the first real time control and evaluation unit 3. The telegram is unpacked in the radio transponder 6 in the field level and the individually calculated parts are compared with one another and thus a correct calculation on the radio transponder 6 is checked and evaluated or verified on the server level.

Defective datasets, for example defective messages or telegrams whose individually calculated parts, that is payload and check data, do not agree are interpreted as a shutdown command by the radio transponder 6, i.e. the system is switched into the safe state by the radio transponder 6 via the safe switch outputs 9.

The messages having the included safety functions or safety information can, for example, be redundantly transmitted to the radio transponders 6 via different radio stations 5 to increase the availability.

The second real time control and evaluation unit 7 is, for example, a server or an industrial computer or an industrial PC, with the server software being configured in two channels.

The radio location system 4 should localize the position of a person or of an object 2 that is marked by a radio transponder 6 within a defined zone in a production facility or a warehouse. If a marked object 2 penetrates into a defined hazard zone that is either a fixed region on a localization map or a defined zone around a radio transponders 6, the safety system 1 sets the cause for the hazard into the safe state. The state of the machine that causes the hazard is controlled by the safe switch outputs 9 of the attached radio transponder 6.

FIG. 2 shows the safety system in a schematic block diagram.

The radio transponder 6 is that part of the radio localization system that is attached to the object 2 to be classified. The radio transponder 6 has a radio transmitter 12 and a radio receiver 13. The radio transponder 6, for example, periodically transmits a radio signal to the radio stations for the localization and receives radio signals from the radio stations to control its safety outputs 9 and so to prevent a hazardous interaction with persons. Radio station signals furthermore serve the verification check of the main position estimate from the radio transponder signals. Such a secondary position determination (secondary position data flow) is implemented, for example, by an additional time stamp of a time stamp generation unit 14 that is added to the radio station signals on arrival and is evaluated in the payload message for the further processing in the second real time control and evaluation unit 7. The radio transponder has a control and evaluation unit 15. The radio transponder furthermore has a message generator 16 or a telegram generator 16.

Radio transponders 6 are provided, for example, for machines (mobile and stationary) and persons. There are a plurality of radio transponders 6 in the radio localization system or radio location system 4. A plurality of instances of the radio transponder 6 are typically used in a safe radio localization system.

The radio station 5 has at least one radio transmitter 29 and one radio receiver 30. The radio station 5 adds a time stamp to the messages of the radio transponder 6 by means of the time stamp generation unit 28 and transmits it to the first real time control and evaluation unit 3 for further processing, including the main position determination that represents the most important safety relevant data flow. A control and evaluation unit 27 is provided in the radio station for this purpose. The radio stations 5 additionally transmit radio station messages that are received by the radio transponders 6 to reset the check unit 8 and to check the plausibility of the position (secondary position data flow).

The synchronization of the radio location system 4 is triggered by the first real time control and evaluation unit 3. So-called master radio stations, for example, transmit a synchronization signal to all the adjacent radio stations 5 that add their time stamp on arrival. The time at which the aster radio stations transmit their signals is reported to the first real time control and evaluation unit 3. Both time stamps are used to determine a common time base.

The first real time control and evaluation unit 3 triggers the synchronization signal to the master radio station. The first real time control and evaluation unit 3 decodes the forwarded telegrams/messages from the radio stations 5 and determines the position of the radio transponders 6 by means of a telegram decoding unit 24. The first real time control and evaluation unit 3 furthermore forwards all the information payload of the radio transponders 6 and radio stations to the safe second real time control and evaluation unit 7. The first real time control and evaluation unit 3 has a position recognition unit 20, a synchronization unit 25, and a message transmission unit 26. The position recognition unit 20 receives the decoded data from the telegram decoding unit 24.

The second real time control and evaluation unit 7 receives the position data from the first real time control and evaluation unit 3 and evaluates the time information and the radio station messages, which results in a second estimate of the radio transponder positions (secondary position data flow). A plausibility check of the position determined by the first real time control and evaluation unit 3 is carried out with this information.

The safety relevant tracking is carried out using these localization data. The result of this operation is the basis for the determination of a reload value for the check unit 8 of the radio transponder 6 and thus the trigger whether a provided plant should be set into a safe state or not. The state of the individual safety relevant outputs 9 is controlled by the check unit 8 of the radio transponders 6. In the second real time control and evaluation unit 7, the safety related evaluation calculates the check unit timer settings for the radio transponders and transmits this information to the safety radio transponders 6 that then reset the check unit 8. This check unit mechanism also acts as a supervisor for the second real time control and evaluation unit 7.

The radio transponder 6 transmits and receives telegrams via radio and controls the safety outputs 9. The control and evaluation unit of the radio transponder 6 evaluates the radio station telegram received via radio. The safety outputs 9 are switched on and off depending on the content of the telegrams. Every received telegram receives a time stamp. The time stamps of the received telegrams are part of the payload for the radio transponder/radio station telegrams. The radio transponder/radio station telegrams are periodically transmitted. The radio station telegram is received by the radio transponder 6, the information is processed, and safety measures are carried out. The payload that is transmitted from the safe second real time control and evaluation unit 7 via the first real time control and evaluation unit 3 to the radio transponders 6 contains the following information, for example:

radio station identification
radio transponder identification as an address
reset timer check unit
safety command (slow, stop, etc.)
check unit setting (only machine radio transponder).

The radio transponder message is transmitted by the radio transponder 6 with the following information that is included in the payload of the telegram:

radio transponder identification
time information (time stamp) of the radio station messages or of its own position if present
safety status (slow, stopped, etc.)
position data
checksum.

The radio stations 5 receive the messages from the radio transponders 6 and synchronization messages from the radio transponders 6.

The radio stations 5 have a radio transmitter and a radio receiver. The radio stations 5 furthermore have a unit for generating a time stamp 28, a unit for telegram generation 16, and a control and evaluation unit 27 that divides the payload to determine the time base (sync payload) and the radio transponder payload to determine the position.

The first real time control and evaluation unit 3 determines the position of the radio transponders 6. The position of the radio transponder 6 is determined on the basis of the times of the messages of the radio transponders 6 and the synchronization messages that are received by different radio stations 5. The first real time control and evaluation unit 3 extracts the payload from the radio transponder message and from the synchronization message. The first real time control and evaluation unit 3 calculates the position and provides the radio transponder payload for a plausibility check. The safety payload from the second real time control and evaluation unit 7 is forwarded to the radio transponders 6. The time synchronization between the master radio station and the adjacent radio stations is additionally triggered.

The second real time control and evaluation unit 7 collects the position data of all the radio transponders 6 from the first real time control and evaluation unit 3 and checks them for plausibility.

The distance (shortest route) between the radio transponders 6 is determined and the reload values for the radio transponder check unit 8 are calculated.

The radio station messages are prepared as the payload using the radio transponder check unit reload values.

The second real time control and evaluation unit 7 checks the radio transponder payload, determines the position of the radio transponders 6 with reference to the data of the radio transponders 6 delivered by the radio transponders, performs plausibility checks for the position of the radio transponders 6, takes over the tracking of all the radio transponders 6, and carries out the safety relevant evaluation.

The second real time control and evaluation unit 7 has two channels. The input, output, and subfunctions are the same for both channels, for example. The two channels or instances of the second real time control and evaluation unit 7 have to provide a sufficiently low probability that a defect affects both channels in the same way and remains undiscovered. An input coordinator 17 therefore receives the input and delivers the information to two independent instances. The two independent instances or channels each have a plausibility check unit 19, a position recognition unit 20, a position plausibility check unit 21, a radio transponder tracking unit 22, and a safety check unit 23. The output coordinate 18 takes the payload from the first channel and the checksum or check data from the second channel and combines them to generate the safety payload. A discrepancy is evaluated in the control and evaluation unit of the radio transponders 6.

REFERENCE NUMERALS

1 safety system
2 spatially variable object
3 first real time control and evaluation unit
4 radio location system
radio stations
6 radio transponder
7 second real time control and evaluation unit
8 check unit
9 safety switch outputs, safety outputs
first channel
11 second channel
19, 29 radio transmitters
13, 30 radio receivers
14, 28 time stamp generation unit
15, 27 control and evaluation unit
16 telegram generator
17 input coordinator
18 output coordinator
19 plausibility check unit
20 position recognition unit
21 position plausibility check unit
22 radio transponder check unit
23 safety check unit
24 telegram decoding unit
24 synchronization unit
26 message transmission unit

What is claimed is:

1. A safety system (1) for localizing at least one spatially variable object (2) having at least one first real time control and evaluation unit (3), having at least one radio location system (4), wherein the radio location system (4) has at least three arranged radio stations (5);

wherein at least one radio transponder (6) is arranged at the object (2);

wherein the at least one radio transponder (6) has a check unit (8); wherein the at least one radio transponder (6) has safe switch outputs (9);

wherein position data of the at least one radio transponder (6) and thus position data of the object (2) are determined by means of the radio location system (4);

wherein the position data are transmitted by the radio stations (5) of the radio location system (4) to the first real time control and evaluation unit (3), wherein the first real time control and evaluation unit (3) is configured to cyclically detect the position data of the at least one radio transponder (6), characterized in that a second real time control and evaluation unit (7) is provided, with the second real time control and evaluation unit (7) being connected to the first real time control and evaluation unit (3), with the first real time control and evaluation unit (3) being checkable by the second real time control and evaluation unit (7), with the second real time control and evaluation unit (7) being configured with two channels, and with there being a radio communication connection between the at least one radio transponder (6) and the second real time control and evaluation unit (7) via the first real time control and evaluation unit (3), and wherein a shutdown path is provided via a radio transmission via the radio communication connection, that is, a wireless transmission of data from the second real time control and evaluation unit (7) to the first real time control and evaluation unit (3) and then to the at least one radio transponder (6).

2. A safety system (1) in accordance with claim 1, characterized in that the second real time control and evaluation unit (7) is a server, with the server or the server software being configured with two channels.

3. A safety system (1) in accordance with claim 1, characterized in that the at least one radio transponder (6) includes a plurality of radio transponders (6), wherein each radio transponder (6) from among the plurality of radio transponders (6) has an identification, wherein each radio transponder (6) of the plurality of radio transponders (6) is associated with a respective object (2), whereby the first real time control and evaluation unit (3) or the second real time control and evaluation unit (7) is configured to distinguish the objects (2).

4. A safety system (1) in accordance with claim 1, characterized in that the radio location system (4) is an ultra wideband radio location system, with the frequency used being in the range from 3.1 GHz to 10.6 GHz, with the transmission energy per radio station (5) amounting to a maximum of 0.5 mW.

5. A method of using a safety system (1) for localizing at least one spatially variable object (2) having at least one first real control and evaluation unit (3), having at least one radio location system (4), wherein the radio location system (4) has at least three arranged radio stations (5);

wherein at least one radio transponder (6) is arranged at the object (2);

wherein the at least one radio transponder (6) has a check unit (8); wherein the at least one radio transponder (6) has safe switch outputs (9);

wherein position data of the at least one radio transponder (6) and thus position data of the object (2) are determined by means of the radio location system (4);

wherein the position data is transmitted by the radio stations (5) of the radio location system (4) to the first real control and evaluation unit (3), wherein the first real time control and evaluation unit (3) is configured to cyclically detect the position data of the at least one radio transponder (6), characterized in that a second real time control and evaluation unit (7) is provided, with the second real time control and evaluation unit (7) being connected to the first real time control and evaluation unit (3), with the first real time control and evaluation unit (3) being checked by the second real time control and evaluation unit (7), with the second real time control and evaluation unit (7) being configured with two channels, and with there being a radio communication connection between the at least one radio transponder (6) and the second real time control and evaluation unit (7) via the first real time control and evaluation unit (3), and wherein a shutdown path is provided via a radio transmission via the radio communication connection, that is, a wireless transmission of data from the second real time control and evaluation unit (7) to the first real time control and evaluation unit (3) and then to the at least one radio transponder (6).

* * * * *